United States Patent
Hino et al.

(10) Patent No.: US 7,603,019 B2
(45) Date of Patent: Oct. 13, 2009

(54) OPTICAL COMMUNICATION MODULE AND MANUFACTURING METHOD THEREOF

(75) Inventors: Masato Hino, Yamanashi (JP); Shinya Suzuki, Yamanashi (JP)

(73) Assignee: Eudyna Devices Inc., Yamanashi (JP)

( * ) Notice: Subject to any disclaimer, the term of this patent is extended or adjusted under 35 U.S.C. 154(b) by 0 days.

(21) Appl. No.: 11/656,948

(22) Filed: Jan. 24, 2007

(65) Prior Publication Data
US 2007/0230875 A1  Oct. 4, 2007

(30) Foreign Application Priority Data
Mar. 29, 2006  (JP) .............................. 2006-092554

(51) Int. Cl.
*G02B 6/00* (2006.01)
*G02B 6/36* (2006.01)

(52) U.S. Cl. ......................................... 385/136; 385/92

(58) Field of Classification Search .............. 385/92–94, 385/136
See application file for complete search history.

(56) References Cited

U.S. PATENT DOCUMENTS

| | | | | | |
|---|---|---|---|---|---|
| 4,273,413 | A | * | 6/1981 | Bendiksen et al. | 385/92 |
| 4,547,039 | A | * | 10/1985 | Caron et al. | 385/88 |
| 5,596,665 | A | * | 1/1997 | Kurashima et al. | 385/88 |
| 5,631,990 | A | * | 5/1997 | Hashizume | 385/92 |
| 6,302,591 | B1 | | 10/2001 | Nagaoka et al. | 385/59 |
| 2003/0223708 | A1 | | 12/2003 | Kurashima et al. | 385/92 |
| 2007/0058911 | A1 | | 3/2007 | Yu et al. | 385/92 |

FOREIGN PATENT DOCUMENTS

| | | |
|---|---|---|
| JP | 2000-081541 | 3/2000 |
| JP | 2003-344714 | 12/2003 |
| JP | 2005-249892 | 9/2005 |
| JP | 2007-078975 | 3/2007 |

OTHER PUBLICATIONS

Japanese Office Action mailed Mar. 24, 2009 with English translation (6 pages).

* cited by examiner

*Primary Examiner*—Charlie Peng
(74) *Attorney, Agent, or Firm*—Kratz, Quintos & Hanson, LLP (57) ABSTRACT

There is provided an optical communication module including a receptacle that has an optical element therein and a brim portion, a chassis on which the receptacle is mounted, and a jig into which the receptacle is inserted, that has an opening smaller than the brim portion, and that presses the brim portion to the chassis.

8 Claims, 7 Drawing Sheets

OPTICAL COMMUNICATION MODULE AND MANUFACTURING METHOD THEREOF

BACKGROUND OF THE INVENTION

1. Field of the Invention

This invention generally relates to optical transmitting/receiving modules for use in optical communication, and more particularly, to a securing method of a receptacle that optically couples optical signals between an optical fiber and an optical transmitting/receiving element.

2. Description of the Related Art

In the technical field of optical communication devices that have been promoted to reduce sizes thereof, a module having communication devices mounted thereon is detachably provided to a cage or the like. For instance, there has been proposed a receptacle that houses an optical transmitting/receiving element such as a semiconductor laser, photo diode, or the like in a case, which is arranged to oppose an optical fiber end so that an optical signal enters or emits from the optical fiber end to input or output the optical signal into or from the optical fiber.

To further reduce the sizes of the optical communication devices, there has been also proposed another receptacle, by which one channel of optical communication is provided as one unit, by accommodating at least an optical transmitting module and an optical receiving module in a single chassis.

To improve the reliability of the aforementioned optical communication module, there are demands for stable coupling and stable shielding at the optical coupling portion to prevent an unnecessary high-frequency signal from leaking to the outside thereof.

Figure 1:
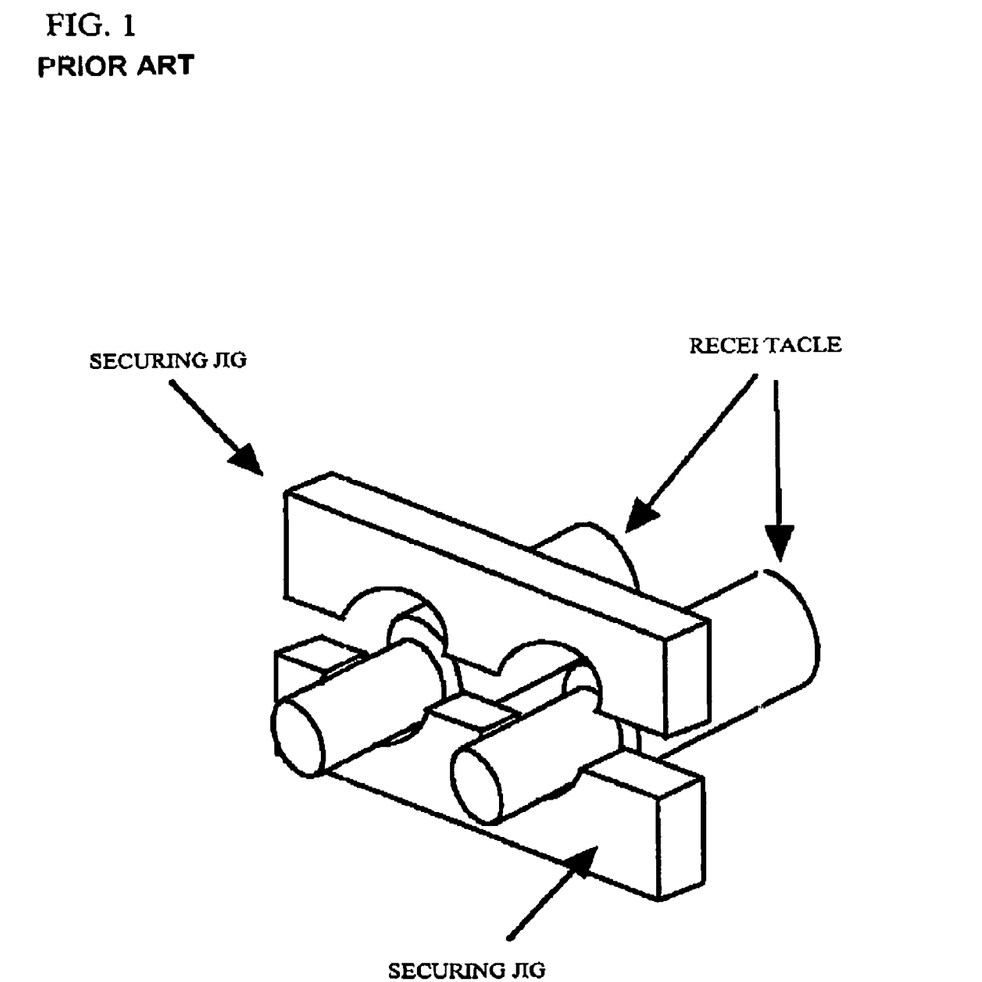
FIG. 1 illustrates a securing method of a conventional receptacle.

Referring now to FIG. 1, as disclosed in Japanese Patent Application Publication No. 2005-249892 (hereinafter, referred to as Document 1), there are provided seeming jigs fixed to the gauge cage to sandwich the receptacle from top and bottom.

In the securing method disclosed in Document 1, however, since it is configured such that the receptacle is just fixed to the gauge, a high-frequency signal is leaked from the coupling portion of the receptacle and an optical fiber connector portion.

In addition, there is another method of attaching the receptacle to the chassis with adhesive. However, the receptacle is attached to the chassis, while the light axis of the optical fiber is being aligned with those of the optical transmitting and receiving elements. This degrades the assembling efficiency, and causes a problem that attachment or detachment is not easy.

SUMMARY OF THE INVENTION

The present invention has been made in view of the above circumstances and provides an optical communication module and a manufacturing method thereof, by which a receptacle is secured to a chassis in a stable manner and a high-frequency signal is shielded with certainty.

According to one aspect of the present invention, there is provided an optical communication module including: a receptacle that has an optical element therein and a brim portion; a chassis on which the receptacle is mounted; and a jig into which the receptacle is inserted, that has an opening smaller than the brim portion, and that presses the brim portion to the chassis. The receptacle having the brim portion is mounted on the chassis, and the brim portion is pressed by the jig against the chassis, thereby securing the receptacle to the chassis in a stable manner and preventing the leakage of a high-frequency signal generating at an optical fiber connector portion.

According to another aspect of the present invention, there is provided a manufacturing method of an optical communication module including: inserting a receptacle having an optical element therein and a brim portion into a cutout portion smaller than the brim portion of a jig; and securing the jig to a chassis and pressing the brim portion of the receptacle against an opening of the chassis.

According to yet another aspect of the present invention, there is provided a manufacturing method of an optical communication module including: inserting a receptacle having an optical element therein and a brim portion, into a cutout portion smaller than the brim portion of a first jig; securing the first jig to a chassis; and securing a second jig to the first jig that presses against the chassis and pressing the brim portion of the receptacle against an opening of the chassis.

BRIEF DESCRIPTION OF THE DRAWINGS

Preferred exemplary embodiments of the present invention will be described in detail with reference to the following drawings, wherein.

DESCRIPTION OF THE PREFERRED EMBODIMENTS

A description will now be given, with reference to the accompanying drawings, of exemplary embodiments of the present invention.

Exemplary Embodiments

Figure 2:
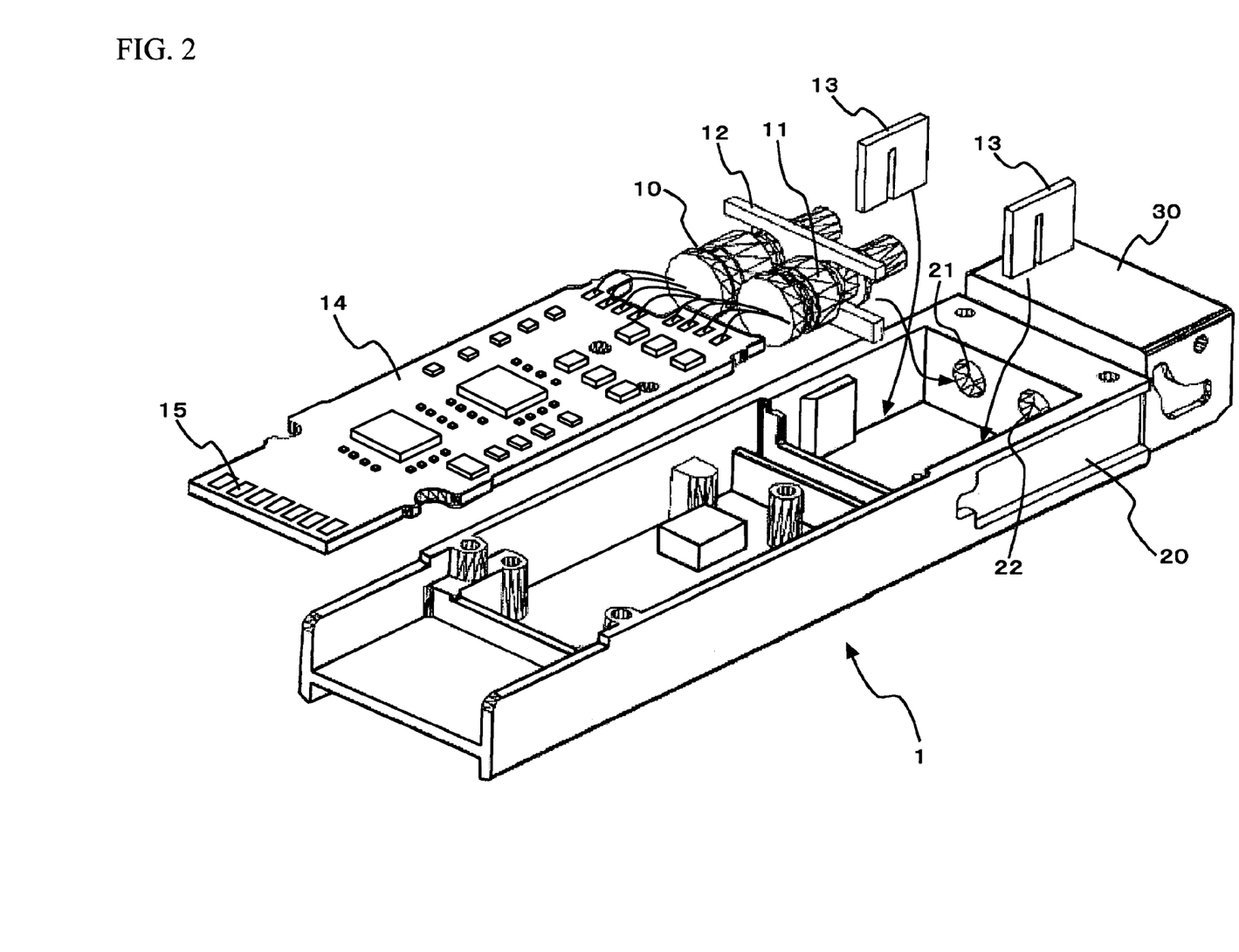
FIG. 2 is an overall view of an optical communication module, and shows an exploded perspective view of a receptacle and a printed board detached from a chassis in accordance with an aspect of the present invention.
Figure 3:
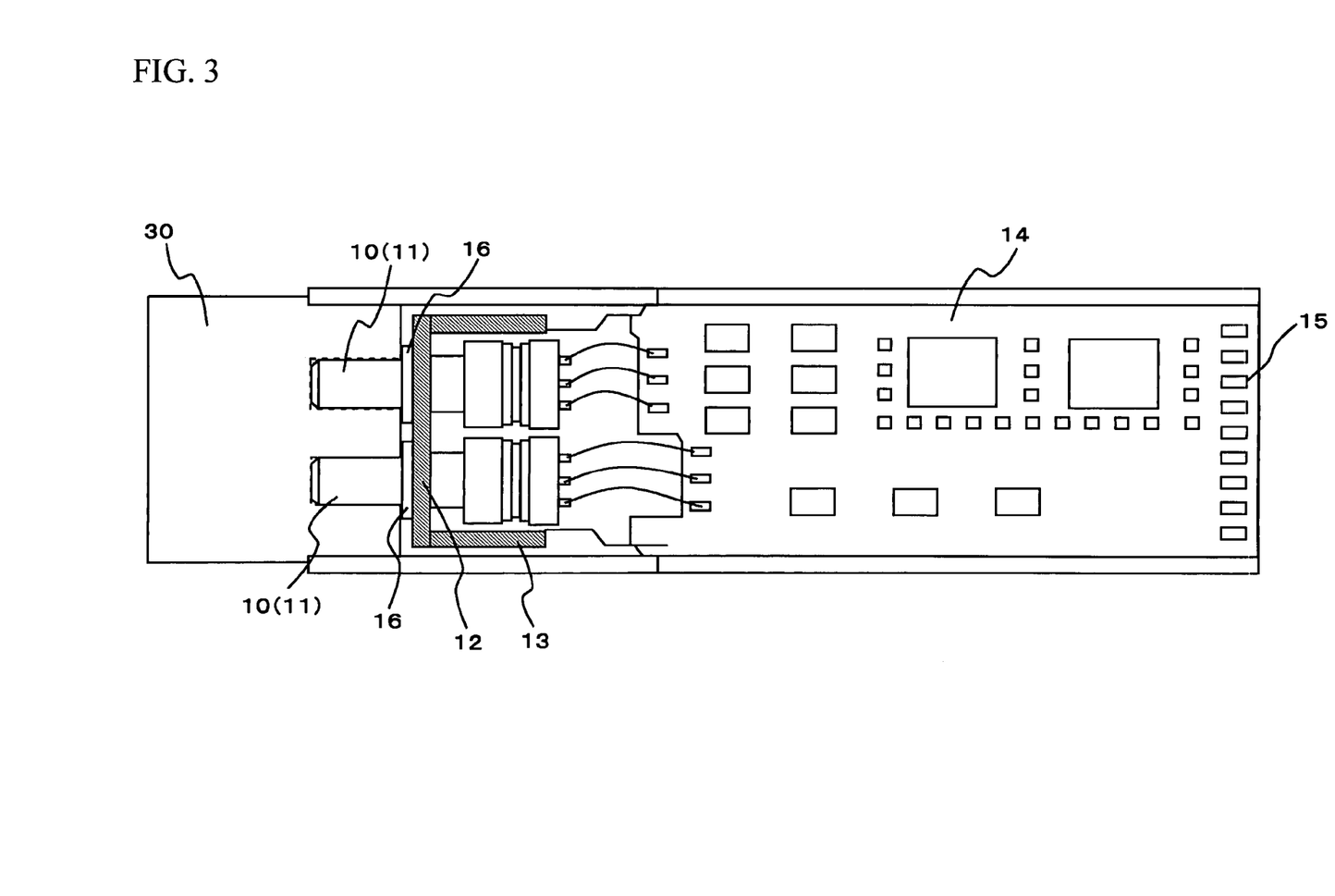
FIG. 3 is a top view of the optical communication module in accordance with an aspect of the present invention.
Figure 4:
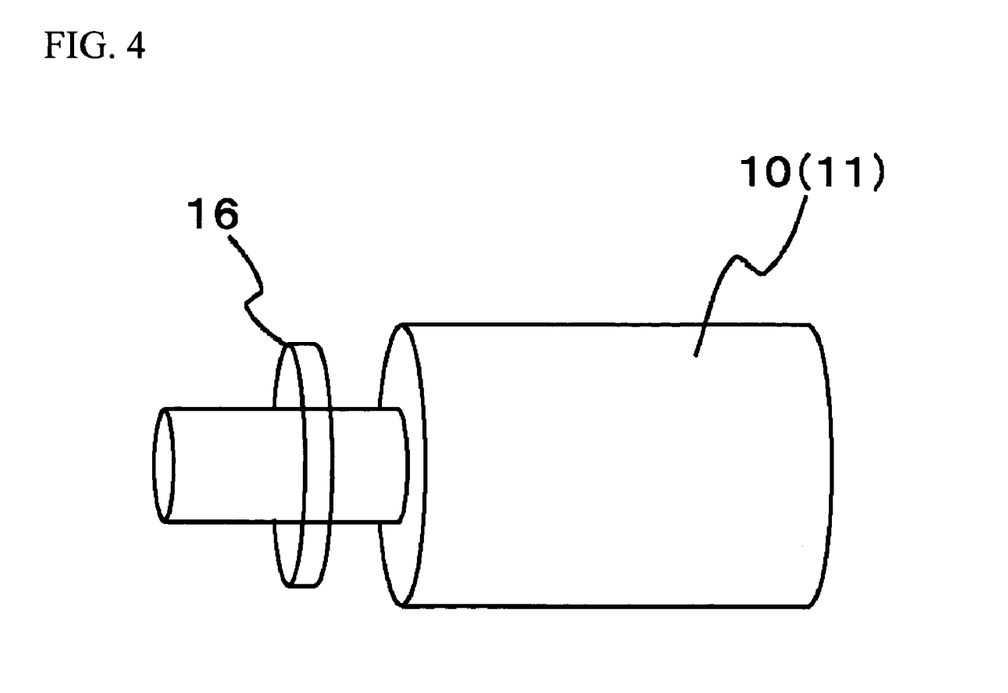
FIG. 4 shows an outer shape of the receptacle in accordance with an aspect of the present invention.

Referring now to FIG. 2 and FIG. 3, a description will be given of the overall configuration of an optical communication module. FIG. 2 shows an exploded perspective view of elements detached from a chassis 20. FIG. 3 is a top view of the optical communication module.

An optical communication module 1 includes, in a single chassis 20: receptacles 10 and 11; and a printed board 14 on which a control circuit of an optical transmitting module and that of an optical receiving module are mounted. The optical transmitting module and the optical receiving module are respectively included in the receptacles 10 and 11.

The control circuits on the printed board 14 are electrically coupled to the receptacles 10 and 11 by lead wires. A connector portion 15 is formed in the printed board 14 for communication with a motherboard. There is also provided wiring for supplying the power to the printed board 14 from the motherboard and for communication therebetween with signals.

The receptacles 10 and 11 respectively include an optical transmitting unit and an optical receiving unit, each of which is composed of: a sleeve; a ferrule that houses a fiber therein; a lens; an optical element (optical transmitting element or optical receiving element); a holder; and the like.

The receptacle 10 and 11 are respectively provided with brim portions 16 in such a manner that the diameters of the brim portions 16 are greater than those of the main bodies of the receptacle 10 and 11. The brim portions 16 are pressed against the chassis 20 by jigs 12 and 13, described later, thereby preventing high-frequency signals generated at a coupling portion of an optical fiber connector portion and the receptacle 10 and 11 from leaking to the printed board 14 side.

The chassis 20 is provided with: a light emitting opening 21 into which the transmitting receptacle 10 is inserted; and a light entering opening 22 into which the receiving receptacle 11 is inserted. The transmitting and receiving receptacles 10 and 11 are respectively inserted into the openings 21 and 22, and are pressed by the jigs 12 and 13 to light axis directions. The chassis 20 is configured such that there is no opening or gap except the light emitting opening 21 and the light entering opening 22.

The jig 12 is a connecting jig that secures the receptacles 10 and 11 to the chassis 20. The jigs 13 are securing jigs 13 that press the connecting jig 12 and the receptacles 10 and 11 secured by the connecting jig 12 against the chassis 20.

In addition, the chassis 20 is provided with an optical interface portion 30 to which the optical fiber connector portion is attached. The optical elements of the receptacles 10 and 11 are optically coupled by attaching the optical fiber connector portion to the optical interface portion 30.

Figure 5:
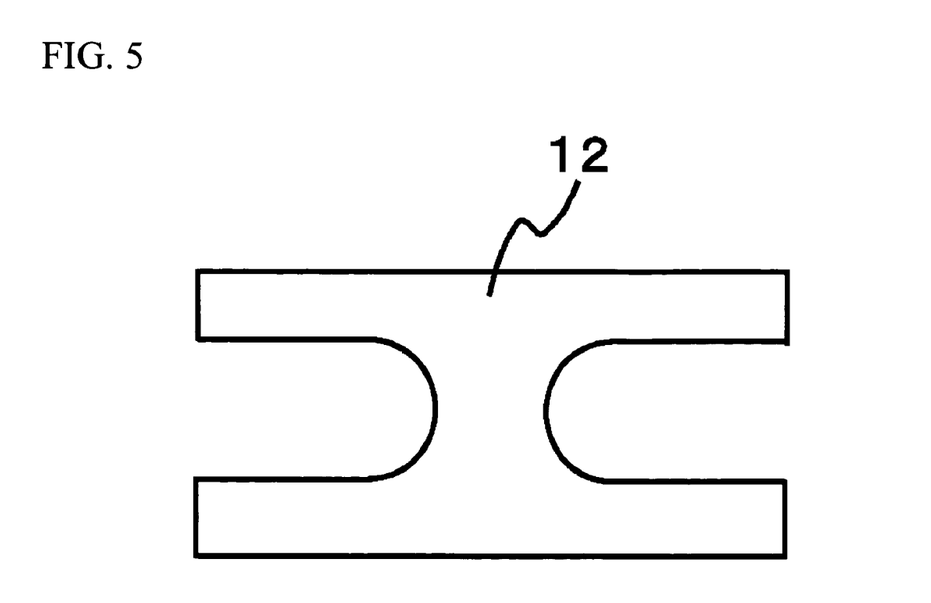
FIG. 5 shows a shape of a connecting jig in accordance with an aspect of the present invention.

The connecting jig 12 is configured to have cutout portions at two sides thereof opposing to each other, and transmitting receptacle 10 and the receiving receptacle 11 are engaged in the cutout portions. The connecting jig 12 has spring characteristics and biases the receptacles 10 and 11 to the light axis directions thereof, when secured to the chassis 20. The connecting jig 12 is brought into contact with the brim portions 16 of the receptacles 10 and 11, and presses the receptacles 10 and 11 to the light axis directions thereof. The connecting jig 12 employed in the present exemplary embodiment has a shape in which both ends thereof are cut away with the central portion thereof remaining, so that the stress is evenly distributed across the connecting jig 12. A material that is hard and easily processed, such as a metal (stainless steel) or plastic may be used for the connecting jig 12.

Figure 6:
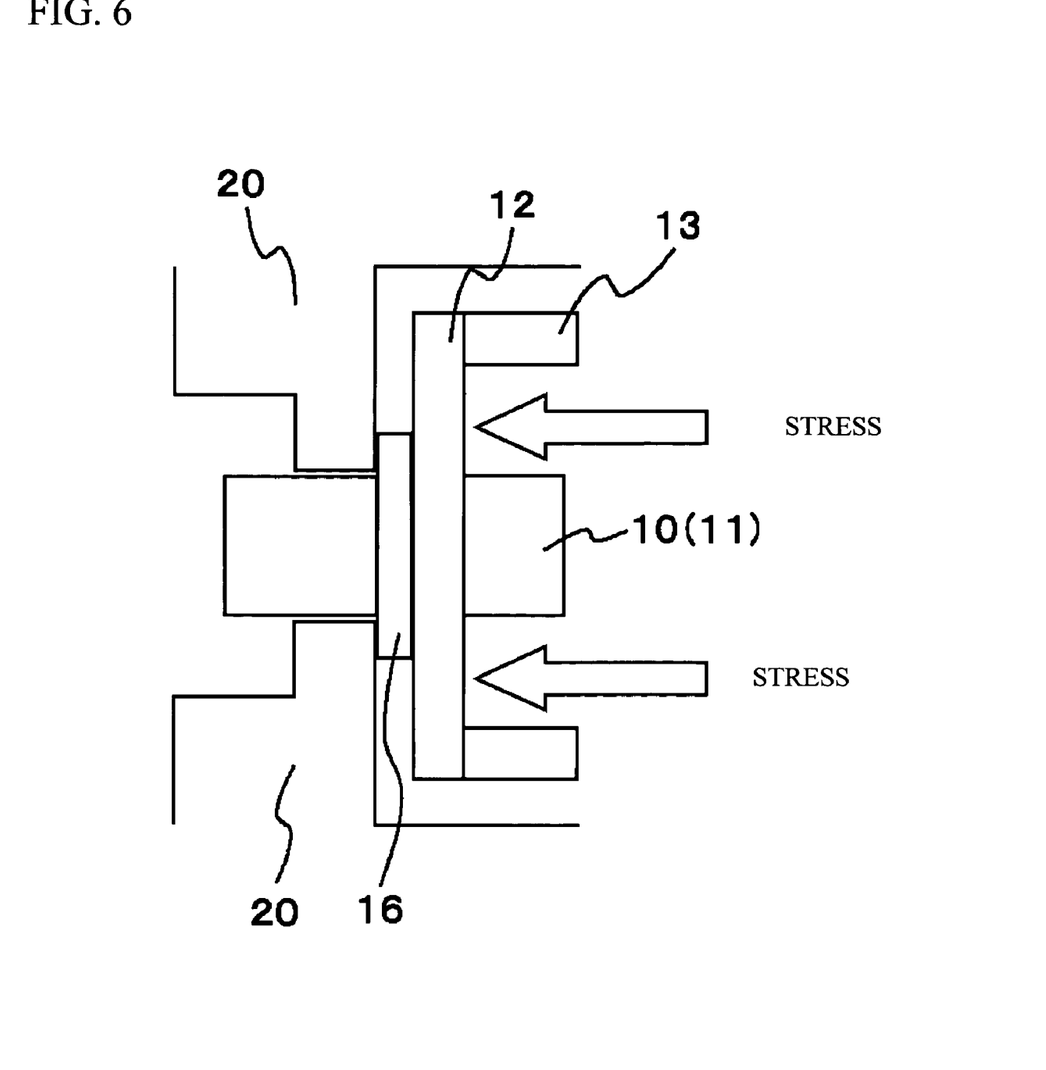
FIG. 6 shows a state where the receptacle is pressed to a light axis direction by the connecting jig and a securing jig in accordance with an aspect of the present invention.
Figure 7A:
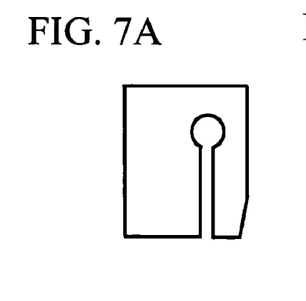
FIG. 7A through FIG. 7C show shapes of the securing jig in accordance with an aspect of the present invention.
Figure 7B:
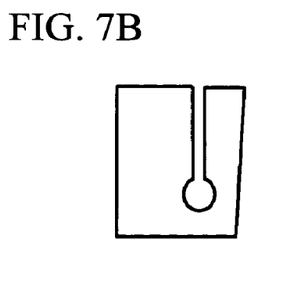
Figure 7C:
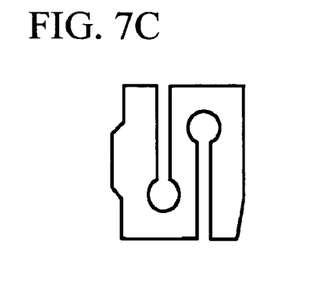

Referring now to FIG. 6, the securing jigs 13 are coupled to the connecting jig 12 at both ends of the connecting jig 12, and press the connecting jig 12 and the receptacles 10 and 11 to the light axis directions. The securing jigs 13 may also be formed of, for example, a metal such as stainless steel or phosphor bronze having spring characteristics, or plastic. The chassis 20 has grooves in which the securing jigs 13 are fit and secured. The securing jigs 13 and the chassis 20 may be wedged and secured. The securing jigs 13 may have a shape of FIG. 7A, FIG. 7B, or FIG. 7C. However, the shape thereof is not especially limited, if the securing jigs 13 have spring characteristics.

Figure 8:
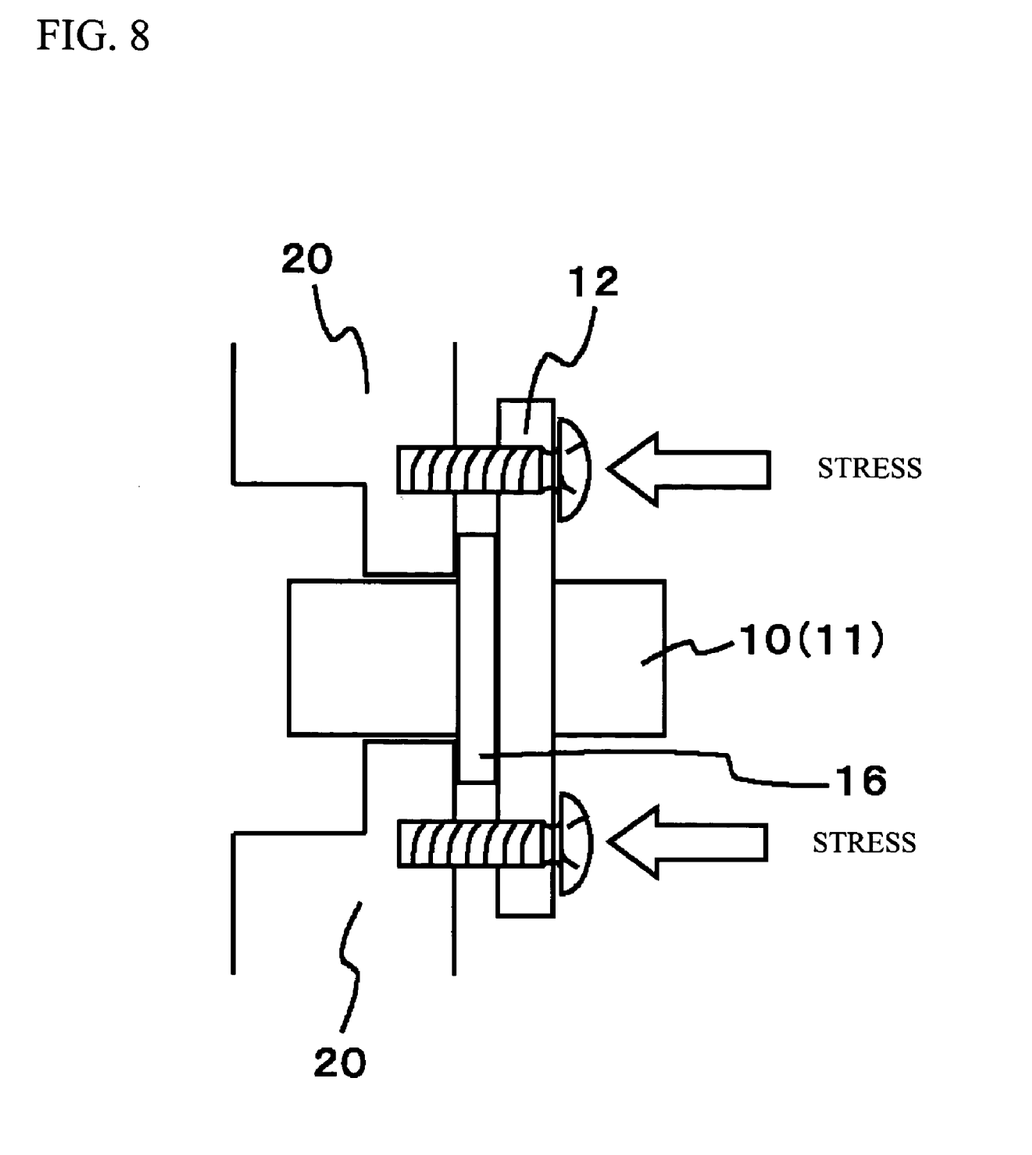
FIG. 8 shows a state where the receptacle is secured to the chassis by screws in accordance with an aspect of the present invention.

In accordance with an aspect of the present invention, there are provided the receptacles 10 and 11 with the brim portions 16, and the receptacles 10 and 11 are pressed and secured by the connecting jig 12 and the securing jigs 13 to the light axis directions. The light emitting opening 21 and the light entering opening 22 arranged at the chassis 20 are tightly pressed by the brim portions 16, thereby preventing high-frequency signals generated at the optical interface portion 30 side from leaking to the printed board side. In addition, the high-frequency signals generated at the printed board 14 side will not leak to the outside of the chassis. Also, the receptacles 10 and 11 may be secured to the chassis 20 by providing thread grooves, as shown in FIG. 8.

Figure 9:
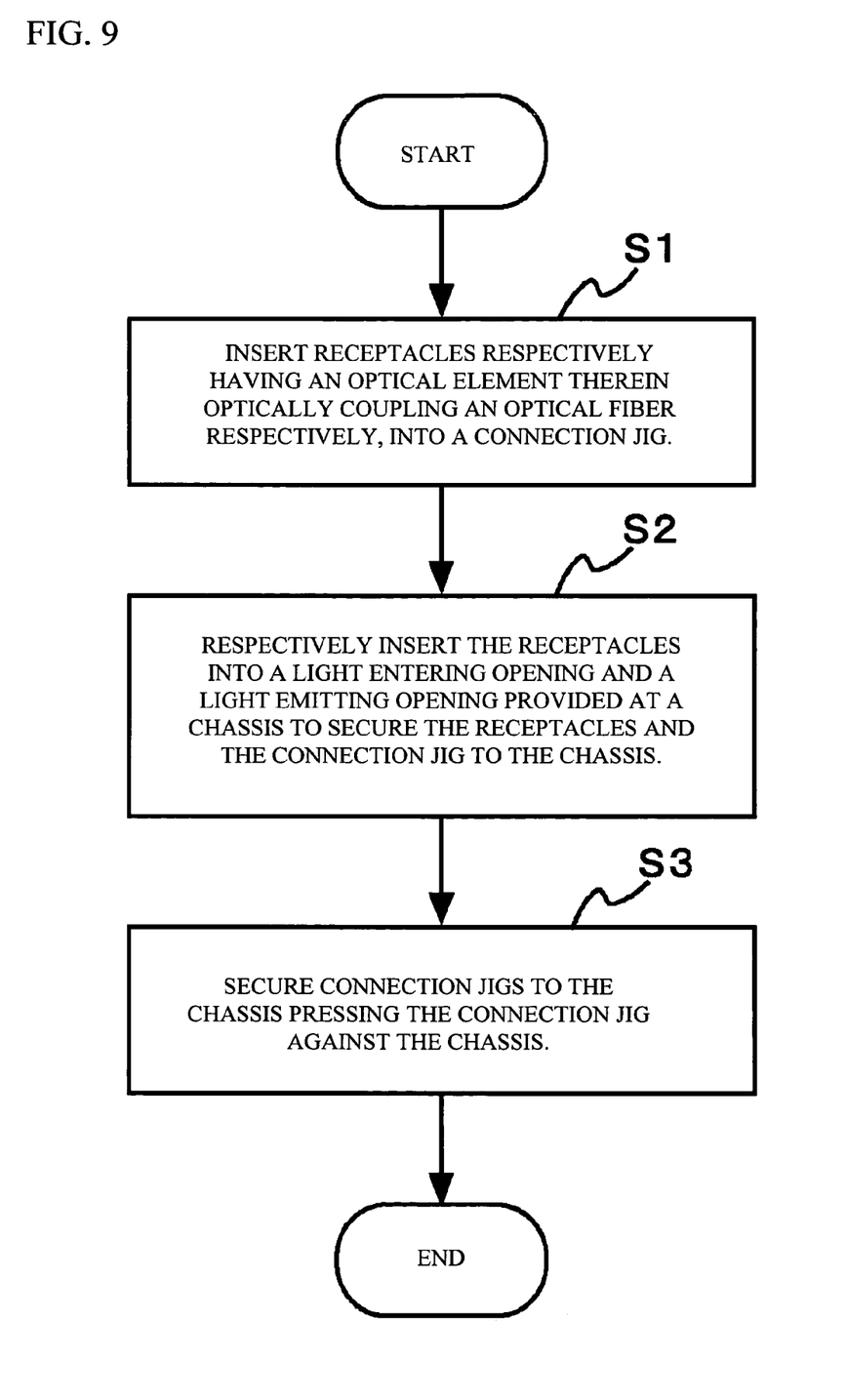
FIG. 9 shows a flowchart of a manufacturing procedure in accordance with an aspect of the present invention.

A description will now be given, with reference to the flowchart of FIG. 9, of a manufacturing procedure of the optical communication module. Firstly, the printed board 14 and the receptacles 10 and 11 are coupled, and the receptacles 10 and 11 are inserted into the cutout portions of the connecting jig 12 (step S1).

Next, end portions of the receptacles 10 and 11 are respectively inserted into the light emitting opening 21 and the light entering opening 22. Here, the brim portions 16 of the receptacles 10 and 11 are made to locate on the light emitting opening 21 side and the light entering opening 22 side (step S2).

Then, the securing jigs 13 are secured to the connecting jig 12. The securing jigs 13 are arranged at both ends of the connecting jig 12, and are arranged on the opposite side of the brim portions 16 with the connecting jig 12 interposed therebetween. The securing jigs 13 are inserted and secured to the grooves provided at the chassis 20 (step S3).

Finally, various aspects of the present invention are summarized in the following.

According to one aspect of the present invention, there is provided an optical communication module including: a receptacle that has an optical element therein and a brim portion; a chassis on which the receptacle is mounted; and a jig into which the receptacle is inserted, that has an opening smaller than the brim portion, and that presses the brim portion to the chassis.

In the above-described optical communication module, the jig may have spring characteristics and presses the receptacle by means of stress. In the above-described optical communication module, the jig may include a first jig in contact with the receptacle and a second jig that presses the first jig to the chassis. By absorbing the difference between the members with the use of a member having spring characteristics, the receptacle can be pressed against the chassis without a gap.

In the above-described optical communication module, the chassis may be provided with an opening having a diameter smaller than that of the brim portion, and the opening is shielded by pressing the brim portion. This can prevent the leakage of a high-frequency signal, with certainty, generating from an optical fiber mounted on the chassis.

In the above-described optical communication module, the chassis may define a groove to which the second jig is secured. Consequently, the second jig can be secured to the chassis with ease.

According to another aspect of the present invention, there is provided a manufacturing method of an optical communication module including: inserting a receptacle having an optical element therein and a brim portion into a cutout portion smaller than the brim portion of a jig; and securing the jig to a chassis and pressing the brim portion of the receptacle against an opening of the chassis.

According to yet another aspect of the present invention, there is provided a manufacturing method of an optical communication module including: inserting a receptacle having an optical element therein and a brim portion, into a cutout portion smaller than the brim portion of a first jig; securing the first jig to a chassis; and securing a second jig to the first jig that presses against the chassis and pressing the brim portion of the receptacle against an opening of the chassis.

In the above-described manufacturing method, the second jig may be engaged in a groove provided at the chassis to be attached to the chassis.

According to an aspect of the present invention, the receptacle can be secured to the chassis in a stable manner, and a high-frequency signal can be shielded with certainty.

Although a few specific exemplary embodiments employed in the present invention have been shown and described, it would be appreciated by those skilled in the art that changes may be made in these exemplary embodiments without departing from the principles and spirit of the invention, the scope of which is defined in the claims and their equivalents.

The present invention is based on Japanese Patent Application No. 2006-092554 filed on Mar. 29, 2006, the entire disclosure of which is hereby incorporated by reference.

What is claimed is:

1. An optical communication module comprising:
    a receptacle that has a unit portion including an optical element therein, an optical fiber connector portion, and a brim portion;
    a chassis on which the receptacle is mounted and that houses a control circuit; and
    a jig into which the receptacle is inserted, that has an opening smaller than the brim portion, and that presses the brim portion to the chassis in a direction toward the optical fiber connector portion from an inside of the chassis so that an entire encircling region of the brim portion contacts a continuous surface of the chassis,
    the brim portion being closer to the optical fiber connector portion than the unit portion.

2. The optical communication module as claimed in claim 1, wherein the jig has spring characteristics and presses the receptacle by means of stress.

3. The optical communication module as claimed in claim 1, wherein the chassis is provided with an opening having a diameter smaller than that of the brim portion, and the opening is shielded by pressing the brim portion.

4. An optical communication module comprising:
    a receptacle that has a unit portion including an optical element therein, an optical fiber connector portion, and a brim portion;
    a chassis on which the receptacle is mounted; and
    a jig into which the receptacle is inserted, that has an opening smaller than the brim portion, and that presses the brim portion to the chassis in a direction toward an optical fiber connector portion so that an entire encircling region of the brim portion contacts a continuous surface of the chassis,
    the brim portion being closer to the optical fiber connector portion than the unit portion,
    wherein the jig includes a first jig in contact with the receptacle for pressing the brim portion to the chassis and a second jig that presses the first jig to the chassis in the same direction that said first jig presses the brim portion.

5. The optical communication module as claimed in claim 4, wherein the chassis defines a groove to which the second jig is secured.

6. A manufacturing method of an optical communication module comprising:
    inserting a receptacle having a unit portion including an optical element therein, an optical fiber connector portion, and a brim portion into a cutout portion smaller than the brim portion of a jig, the brim portion being closer to an optical fiber connector portion than the unit portion; and
    securing the jig to a chassis that houses a control circuit and pressing the brim portion of the receptacle against an opening of the chassis in a direction toward the optical fiber connector portion from an inside of the chassis so that an entire encircling region of the brim portion contacts a continuous surface of the chassis.

7. A manufacturing method of an optical communication module comprising
    inserting a receptacle having a unit portion including an optical element therein, an optical fiber connector portion, and a brim portion into a cutout portion smaller than the brim portion of a first jig, the brim portion being closer to an optical fiber connector portion than the unit portion; and
    securing the first jig to a chassis that houses a control circuit; and
    securing a second jig to the first jig that presses against the chassis and pressing the brim portion of the receptacle against an opening of the chassis in a direction toward the optical fiber connector portion from an inside of the chassis so that an entire encircling region of the brim portion contacts a continuous surface of the chassis.

8. The manufacturing method as claimed in claim 7, wherein the second jig is engaged in a groove provided at the chassis to be attached to the chassis.

* * * * *